United States Patent Office 3,356,753
Patented Dec. 5, 1967

3,356,753
PRODUCTION IN PURE FORM OF COMPOUNDS OF THE CAROTENOID AND VITAMIN-A SERIES
Wilhelm Sarnecki, Ludwigshafen (Rhine), Germany, assignor to Badische Anilin- & Soda-Fabrik Aktiengesellschaft, Ludwigshafen (Rhine), Germany
No Drawing. Filed July 6, 1964, Ser. No. 380,656
Claims priority, application Germany, July 19, 1963, B 72,746
10 Claims. (Cl. 260—666)

ABSTRACT OF THE DISCLOSURE

A process for preparing water-insoluble and sparingly water-soluble compounds of the carotenoid and vitamin-A series by treating the impure compound with a water-soluble surfactant and water and subsequently washing said compound with water. In a specific example, deep orange red axerophthene and polyoxyethylated castor oil are melted together, the melt is dispersed in water and almost colorless axerophthene is isolated.

This invention relates to a new, industrially very advantageous and economical process for the production in a pure form of compounds of the carotenoid and vitamin-A series.

Carotenoids, for example compounds of the vitamin-A series, which have been isolated from natural sources usually contain accompanying substances which are difficult to separate. Synthetic preparations are also often contaminated by byproducts which can only be removed with difficulty. Moreover all these compounds are very sensitive substances so that even in pure preparations decomposition and oxidation products form after storage and these often cannot be separated by simple purification methods, such as recrystallization. Byproducts and decomposition products of the said type impart dark coloration, unpleasant taste or odor to the carotenoids and often accelerate their further decomposition; their value is thus decreased.

This known sensitivity of compounds of the vitamin-A series and other carotenoids is a fundamental difficulty in preparing them in a pure state. Thus for example vitamin-A esters are partly degraded to anhydrovitamin-A and other products during recrystallization from alcohols (cf., inter alia, E. J. Shantz, J. Am. Chem. Soc., 65, 901 (1943), and A. J. Forlano, L. E. Harris, Journal of the American Pharmaceutical Association, Scientific Edition, 49, 451, 458 (1960)).

Even in the classic method of purification for carotenoids, namely chromatography, the products used are often oxidized (cf. M. G. Marmori, Arch. Sci. Biol., 45, 154 (1961)).

In the industrial production of compounds of the vitamin-A series and the carotene series, the end products are therefore usually purified by repeated recrystallization, but even then it is not possible to remove all impurities. If a higher degree of purity is required, expensive methods, such as chromatography and countercurrent distribution, are necessary, in which fresh decomposition products may occur owing to the cumbersome operation. In another purification method, molecular distillation (K. C. D. Hickman, Ind. Eng. Chem., 29, 968, 1107 (1937)), impurities having about the same molecular weight are not separated. A simple purification method generally applicable to the carotenoid and vitamin-A series has not hitherto been known.

The object of the present invention is to provide a simple, effective and economical process for making compounds of the carotenoid and vitamin-A series in the pure state.

I have found that compounds of the carotenoid and vitamin-A series can be obtained in an extremely pure condition in an industrially advantageous way by treating them with water-soluble surfactants and then washing them with water.

Compounds of the carotenoid and vitamin-A series (hereinafter referred to as carotenoids) include those compounds insoluble or sparingly soluble in water which are defined as "carotenoids" in Hackh's Chemical Dictionary, 3rd edition, and also derivatives and structural isomers of these compounds.

The new purification process is based on the surprising principle that the impurities contained in carotenoids are absorbed by the water-soluble surfactants and can be kept in aqueous solution. The surfactants may also be regarded as solubilizers for the impurities.

All surfactants for aqueous systems are capable of acting as such solubilizers. From among the many substances of this type, which may also be mixed provided they are compatible with each other, the following list gives only those which are the more important industrially:

(A) Anionic surfactants such as:
alkali metal or ammonium salts of high molecular weight carboxylic acids (soaps) which may bear substituents or whose carbon chain may be interrupted by hetero atoms, alkali metal or ammonium salts of acid sulphuric acid esters of primary or secondary fatty alcohols, of fatty acid monoglycerides and fatty acid alkylolamides, of hydroxyfatty acids, of unsaturated fatty acids or derivatives thereof,
alkali metal or ammonium salts of alkylsulfonic acids whose carbon chains may be interrupted by hetero atoms or may bear other substituents,
alkali metal or ammonium salts of ligninsulfonic acids or of sulfite waste liquors from the production of cellulose, salts of alkylarylsulfonic acids and the like;

(B) Cationic surfactants such as:
primary, secondary and tertiary amines, nitrogenous heterocycles and other nitrogen bases and their salts, quaternary amines and their salts, and
nitrogen-free organic bases and their salts. In all these bases, the effective basic (hydrophilic) groups may be joined to the hydrophobic radical by bridging groups, for example

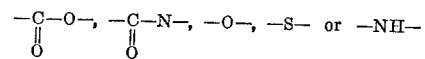

or the hydrophobic radical may contain such groups.

(C) Nonionic surfactants such as:
esters and ethers of polyhydroxy compounds and their polyoxyalkylation products, polyoxyethylated ethers of alkylphenols, alcohols and mercaptans, and polyoxyalkylated carboxylic esters, N-hydroxyalkylcarbonamides and their polyoxyalkylation products, polyoxyalkylated sulfonamides and the like;

(D) Ampholytic surfactants such as alkylaminoacetic acids.

Other water-soluble surfactant substances, and also more detailed statement as to their definition may be taken inter alia from the book "Surface Active Agents" by Schwartz/Perry, volume 1 (1949) and volume 2 (1958), Interscience Publishers, New York.

Since it is essential to bring the carotenoids into the most intimate contact possible with the solubilizer, a particularly important embodiment of the process according to this invention is to dissolve the carotenoid in the solubilizer and to introduce the solution into water with vigorous stirring or to add water with vigorous stirring. The carotenoid thus separates in a pure crystalline form, whereas the impurities pass into solution. Separation of the crystals may be accelerated by cooling the mixture to about 0° C., but this is not essential. It may even sometimes be advantageous to allow crystallization to take place at elevated temperatures so that coarser crystals form.

This method presupposes that the solubilizer will form solutions or homogeneous melts with the carotenoid in the temperature interval between about 30° and 150° C. Solubilizers which are suitable for this purpose may easily be ascertained by preliminary experiment. Examples of suitable solubilizers are polyoxyethylated castor oil, polyethoxysorbitan oleate or laurate, polyoxyethylated alcohols, such as polyethoxy coconut oil fatty alcohols, polyoxyethylated fatty acid amides, such as polyoxyethylated oleic ethanolamide and polyoxyethylated aliphatic amines, such as polyethoxyoleylamine. Other substances well suited to the purpose are for example oleic diethanolamide and waxy or pasty salts of anionic and cationic surfactant compounds, such as the dimethylaniline salts of alkylbenzenesulfonic acids or N-lauryl-N-methylimidazolium methyl sulfate.

It is however not essential for the success of the purification process for the carotenoid and the solubilizer to be able to form a homogeneous phase. Finely divided dispersions may also be prepared from the two components at the said working temperatures by intense agitation by means of impellers or vibrators, and the dispersions used in the same way as the solutions.

It is also possible to start direct from aqueous carotenoid dispersions, to add solubilizers thereto or to introduce an aqueous solution of the solubilizer and to bring the solid substance into intimate contact with the aqueous phase by intense stirring. The most advantageous working temperatures are between 0° and 100° C.

In all embodiments of the process, the minimum amount of solubilizer required is normally 10% by weight of the amount of carotenoid. Naturally the amount of solubilizer depends on the individual case and may be smaller or, more usually, larger depending on the degree of contamination. In general there is no harm in an excess of solubilizer, but it may retard the separation of the carotenoid. Not more than about 500% by weight of the solubilizer, with reference to the carotenoid, is therefore usually added. This amount may however be considerably exceeded, particularly in the case of salt-like solubilizers, or if water is already present, and may amount to up to ten times the amount of carotenoid.

In all cases the pure carotenoid is obtained as a crystallisate which may be isolated by conventional methods, for example by filtration and centrifuging. It is freed from adherent solubilizer by washing with water and then dried. To facilitate drying, the water-moist crystals may be washed with water-soluble readily volatile organic solvents, as for example alcohols, or recrystallized from such solvents.

The carotenoids thus obtained are considerably purer than before the treatment. Accordingly they have higher melting and solidification points, higher specific extinctions at the characteristic absorption maxima and also for example greater thermal stability. Colored extraneous substances have also been removed. This is known by the fact that the specific extinctions in the spectral regions of lower extinctions often fall with respect to the initial materials.

To exclude oxidation reactions during the purification process it is recommendable not only to work under an inert gas atmosphere but also to add antioxidants in individual stages or in all stages. It is an advantage of the new process that oil-soluble antioxidants, such as 2-tertiary-butyl-4-hydroxyanisole, 3-tertiary-butyl-4-hydroxyanisole, 2,6-tertiary-butyl-p-cresol and tocopherols, and also water-soluble antioxidants, such as ascorbic acid, may be used and their actions combined.

The new process permits an effective, simple and economically relatively advantageous purification of carotenoids, for example compounds of the vitamin-A series, and is therefore a valuable contribution to the art.

The invention is illustrated by the following examples in which parts and percentages are units of weight unless otherwise stated.

*Example 1*

25 parts of deep orange red axerophthene (melting point 73° to 75° C.; E (323 millimicrons)=169.6; E (440 millimicrons)=$30.10^{-3}$; E (450 millimicrons)=$24.10^{-3}$) and 25 parts of polyoxyethylene castor oil are mixed well at 85° to 90° C. under a nitrogen atmosphere. 75 parts by volume of water is added to the mixture at 80° C. and the whole is stirred overnight at room temperature. The deposited crystals are filtered off, washed with water and with strongly cooled methanol (−20° C.) and dried. 20.5 parts of almost colorless axerophthene is obtained (melting point 81° to 82° C.; E (323 millimicrons)=188.7; E (440 millimicrons)=$1.2 \times 10^{-3}$; E (450 millimicrons)=$0.5 \times 10^{-3}$).

*Example 2*

2 parts of axerophthene having a melting point of 69° to 74° C. is mixed with 28 parts of water and 12 parts of diisobutylnaphthalene sulfonate at 80° to 85° C. under a nitrogen atmosphere. The mixture is cooled in an ice bath for one hour. The crystals deposited are washed with water and ice-cooled methanol and dried. 1.4 parts of axerophthene is obtained which has a melting point of 76° to 78° C.

Similar results are obtained by using 405 parts of water and 45 parts of the sodium salt of diisobutylnaphthalene-1-sulfonic acid, or 8 parts of water and 12 parts of diisobutylnaphthalene sulfonate, to 2 parts of axerophthene.

*Example 3*

26 parts of all-trans-vitamin-A alcohol (melting point 54.4° to 57° C., E (327 millimicrons)=162) is dissolved in 13 parts of polyoxethylene castor oil at 60° C. under a nitrogen atmosphere. The mixture is cooled to room temperature, 120 parts of water is added and the whole stirred for sixteen hours. The deposited crystals are filtered off, washed with water and dried in a high vacuum. 24 parts of colorless vitamin-A alcohol is obtained (melting point 59° to 60.5° C., E (327 millimicrons)=174).

*Example 4*

16 parts of vitamin-A acetate (melting point 57.5° to 59° C.) is stirred under a nitrogen atmosphere with 30 parts of water and 5 parts of commercial curd soap at 80° C. The strongly frothing mixture is allowed to stand overnight at room temperature and the deposited crystals are then filtered off and washed with water. After they have been dried, 14 parts of vitamin-A acetate is obtained having a melting point of 59° to 60° C.

*Example 5*

50 parts of partly oxidized vitamin-A acetate (which loses about 60% of its activity in twenty-four hours when heated at 100° C. while excluding air) is dissolved under a nitrogen atmosphere at 60° C. in a mixture of 25 parts of polyoxyethylene castor oil, 0.25 part of 2 (or 3)-tertiary-butyl-4-hydroxyanisole (BHA) and 1 part of tocopherol. The whole is cooled to room temperature and the mixture is added to a solution of 0.5 part of ascorbic acid in 150 parts by volume of water and stirred for eighteen hours. The deposited crystals are filtered off, washed with water and with methanol (at −20° C.) and dried. 43.5 parts of vitamin-A acetate having a melting point of 59° to 60.5° C. is obtained which loses only about 20% of its activity when heated for twenty-four hours at 100° C. while excluding air.

*Example 6*

25 parts of orange colored vitamin-A acetate (melting point 57° C.), 25 parts of polyoxyethylenesorbitan oleate and 0.4 part of 2,6-ditertiary-butyl-p-cresol are mixed under an atmosphere of nitrogen at 80° C. The mixture is added to 100 parts of water and the whole stirred for twenty-one hours at room temperature. Further processing is as described in Example 5. 24 parts of almost colorless vitamin-A acetate is obtained having a melting point of 60° to 60.5° C.

*Example 7*

A melt of 50 parts of deep yellow vitamin-A acetate (melting point 52° to 55° C.) is introduced into 50 parts of polyoxyethylenesorbitan laurate at 20° C. under a nitrogen atmosphere. 200 parts of water is then added and the mixture is stirred for fifteen hours. The deposited crystals are filtered off, washed with water and recrystallized in the water-moist condition in 75 parts of isopropanol. 44 parts of almost colorless vitamin-A acetate is obtained (melting point 58.5° to 60° C.).

*Example 8*

50 parts of deep yellow vitamin-A acetate (E (440 millimicrons)=28.10$^{-3}$) and 25 parts of polyoxyethylene castor oil are mixed at 150° C. under nitrogen. The mixture is cooled to below 100° C. and poured into 75 parts of water and further processed as described in Example 5. 40 parts of almost colorless vitamin-A acetate is obtained (E (440 millimicrons)=5.7×10$^{-3}$).

*Example 9*

25 parts of vitamin-A acetate (melting point 57° C.), which loses about 25% of its activity when heated for twenty-four hours at 100° C., is mixed with 50 parts of a mixture of equal amounts of polyoxyethylenesorbitan laurate and polyoxyethylene castor oil under a nitrogen atmosphere at 70° C. The mixture is cooled in an ice bath and a solution of 25 parts of ascorbic acid in 300 parts of water is added. Further processing is carried out as described in Example 5. 21 parts of vitamin-A acetate (melting point 59.5° to 60° C.) is obtained which loses only about 15% of its activity when heated for twenty-four hours at 100° C.

*Example 10*

2.0 parts of the methyl ester of vitamin-A acid (melting point 70° to 71° C.) is mixed with 0.5 part of polyoxyethylene castor oil at 70° C. under nitrogen. The mixture has 20 parts of water added to it and is stirred at room temperature. Further processing takes place as described in Example 5. 1.88 parts of the methyl ester of vitamin-A acid is obtained having a melting point of 73° C.

*Example 11*

3.5 parts of retinene (boiling point 56° to 59.5° C.; E (381 millimicrons)=107), 7 parts of polyoxyethylene castor oil are mixed at 60° C. under nitrogen. 40 parts of water is added to the mixture and the whole stirred for eighteen hours at room temperature. The deposited crystals are filtered off, washed with water and dried in a high vacuum. 2.5 parts of retinene is obtained (melting point 62.5° to 63.5° C.; E (381 millimicrons)=144).

*Example 12*

50 parts of polyoxyethylenesorbitan laurate and 15 parts of 13-[2′,6′,6′-trimethylcyclohexene-(1′)-yl-(1′)]-3,7,11 - trimethyltridecahexaene - (2,4,6,8,10,12) - acid-(1)-ethyl ester (melting point 92° to 102° C.; E (399 millimicrons)=142, i.e. 76% of the theoretical extinction) are mixed at 110° C. under nitrogen. Water is added to the mixture and the whole stirred for sixteen hours at room temperature. The deposited crystals are filtered off, washed with water and ice-cooled methanol and dried. 9 parts of the pure ester is obtained (melting point 108° to 110° C.; E (399 millimicrons)=187).

*Example 13*

1.0 part of axerophthene (melting point 71° to 73° C.) is mixed at 80° C. with 2.0 parts of solubilizer under an atmosphere of nitrogen. 40 parts of water is added to the mixture and the mixture further processed as described in Example 5 after two days.

The following yields and melting points of axerophthene are obtained by using various solubilizers:

| Solubilizer | Axerophthene | |
|---|---|---|
|  | Yield | M.P., °C. |
| (a) Laurylmethyl imidazolium methosulfate | 0.6 | 76–78 |
| (b) Oleic diethanolamide | 0.7 | 79–80 |
| (c) Polyoxyethylated oleic ethanolamide | 0.6 | 78–79 |

*Example 14*

2 parts of β-carotene (melting point 174° to 178° C.) is stirred under a nitrogen atmosphere with 6 parts of polyethoxy castor oil at 70° C. The crystal mash thus obtained has 25 parts of water added to it at room temperature and stirred for sixty hours. The residue is filtered off and washed with water and methanol. 1.9 parts of β-carotene is obtained, melting point 178° to 179° C.

*Example 15*

5 parts of vitamin-A acetate (melting point about 56° C.; E (440 millimicrons)=0.03), 2.8 parts of trimethylstearyl ammonium methosulfite and 27 parts of water are stirred under a nitrogen atmosphere for about twenty hours at room temperature. The solid portion is centrifuged off and washed several times with water. The product is dried and 3.6 parts of vitamin-A acetate (melting point 58° C.; E (440 millimicrons)=0.02) is obtained.

*Example 16*

50 parts of vitamin-A acetate (melting point 57° C.), 50 parts of polyoxyethylated castor oil and 75 parts of water are stirred for nineteen hours at room temperature under a nitrogen atmosphere. The whole is then filtered. The residue is washed with water and methanol (−20° C.) and dried. 42 parts of vitamin-A acetate (melting point 58.5° to 60° C.) is obtained.

*Example 17*

5.0 parts of vitamin-A acetate is stirred with 7.5 parts of the disodium salt of ethylene diamine tetraacetic acid under nitrogen at room temperature for sixteen hours. Processing is carried out as described in Example 16. 4.9 parts of vitamin-A acetate (melting point 59° C.) is obtained.

*Example 18*

5.0 parts of orange vitamin-A acetate (melting point 57° C.) is mixed with 7.5 parts of Turkey Red oil under nitrogen at 60° C. 50 parts of water is added to the mixture and the whole allowed to stand for sixteen hours. Further processing is as described in Example 16. 3.8 parts of almost colorless vitamin-A acetate (melting point 59.5° to 60.5° C.) is obtained.

*Example 19*

6.0 parts of vitamin-A acetate (melting point 57° C.) is stirred with a solution of 6 parts of 2,4,6-trimethyl-4- stearyl-morpholinium methosulfate in 56 parts of water for sixteen hours under nitrogen at room temperature. Further processing is carried out as described in Example 16. 5.8 parts of vitamin-A acetate is obtained (melting point 59° C.).

*Example 20*

5.0 parts of vitamin-A acetate (melting point 57° C.) is mixed with 25 parts of polyoxyethylated oleylamine at 60° C. under nitrogen. After the mixture has been cooled, 4 parts of water is added at room temperature and then, after stirring for eighteen hours, another 50 parts of water is added. Half an hour later, the deposited crystals are filtered off and washed with water. The product is dried and 4.5 parts of vitamin-A acetate (melting point 59.5° to 60° C.) is obtained which is clearly lighter in color than the initial material.

*Example 21*

1.0 part of vitamin-A acetate (melting point 57° C.) is mixed at 80° C. under nitrogen with a solution of 20 parts of the sodium salt of dinaphthylmethane-$\beta,\beta'$-disulfonic acid. The mixture is cooled to room temperature and stirred for another nineteen hours. Further processing is carried out as described in Example 20. 0.8 part of vitamin-A acetate (melting point 59° to 59.5° C.) is obtained.

*Example 22*

5.0 parts of vitamin-A acetate (melting point 56.5° C.) and 2.5 parts of a polyoxyethylated $C_{16}$–$C_{18}$ coconut oil fatty alcohol are mixed under nitrogen at 65° C. The mixture is cooled to 25° C., a few drops of water are added and the whole is stirred for sixteen hours. 50 parts of water is then added, the whole stirred for another thirty minutes and the deposited crystals are filtered off. Further processing is carried out as described in Example 20. 4.6 parts of vitamin-A acetate (melting point 59.0° to 59.5° C.) is obtained.

*Example 23*

1.0 part of vitamin-A acetate (melting point 57° C.) and 10 parts of the sodium salt of sulfosuccinic diisooctyl ester are mixed at 65° C. under nitrogen. The mixture is cooled to 25° C. and further treated as described in Example 22. 0.83 part of vitamin-A acetate (melting point 59° C.) is obtained.

*Example 24*

2.5 parts of vitamin-A acetate (melting point 57° C.), 10 parts of benzylpyridinium chloride and 10 parts of water are stirred at room temperature for eighteen hours. Then 50 parts of water is added and the whole is stirred for another thirty minutes and filtered. Further processing is carried out as described in Example 20. 2.2 parts of vitamin-A acetate (melting point 58.5° C.) is obtained which exhibits a much lighter shade of color than the initial material.

*Example 25*

5.0 parts of vitamin-A acetate (melting point 57° C.) and 2.5 parts of dimethylaniline dodecylbenzenesulfonate are fused under nitrogen at 65° C. The mixture is cooled to 25° C. and further treated as described in Example 22. 4.5 parts of vitamin-A acetate (melting point 59.5° C.) is obtained.

*Example 26*

1.0 part of vitamin-A acetate (melting point 57° C.) is mixed with 20 parts of a mixture containing inorganic salts and about 40% of sodium salts of acid sulfuric acid esters of $C_8$–$C_{18}$ coconut oil alcohols and 20 parts of water at 45° C. under nitrogen. The mixture is stirred for twenty hours at room temperature, 50 parts of water is added and the whole worked up as described in Example 20. 0.8 part of vitamin-A acetate (melting point 58.5° C.) is obtained.

*Example 27*

1.0 part of vitamin-A acetate (melting point 57.0° C.) is stirred with 5 parts of triethanolamine monostearate and 20 parts of water under nitrogen for seventeen hours at room temperature. The product is filtered off and further treated as described in Example 20. 0.9 part of vitamin-A acetate (melting point 58.5° C.) is obtained.

*Example 28*

1.0 part of vitamin-A acetate (melting point 57.0° C.) and 3.5 parts of a mixture of sodium salts of $C_{12}$–$C_{18}$ alkylsulfonic acids and 10 parts of water are stirred under nitrogen for seventeen hours at room temperature, then 50 parts of water is added and the whole further processed as described in Example 20. 0.7 part of vitamin-A acetate (melting point 59.5° C.) is obtained.

*Example 29*

6.0 parts of vitamin-A acetate (melting point 57° C.) and 6.0 parts of polyoxyethylated isooctylphenol are mixed at 65° C. under nitrogen. The mixture is cooled to room temperature and further processed as described in Example 22. 5.4 parts of vitamin-A acetate (melting point 59° C.) is obtained.

*Example 30*

1.0 part of vitamin-A acetate (melting point 57.5° C.) and 20 parts of a purified sulfite waste liquor which contains the sodium salt to the extent of about 40% are mixed at 45° C. under nitrogen, stirred for fifteen hours at room temperature, 50 parts of water is added and the whole further processed as described in Example 20. 0.97 part of vitamin-A acetate (melting point 59° C.) is obtained.

I claim:

1. A process for purifying water-insoluble or sparingly water-soluble compounds of the carotenoid and vitamin-A series which comprises treating one of the said compounds with a water-soluble surfactant and treating it with water and thereafter washing said compound with water.

2. A process as claimed in claim 1 wherein a surfactant is used which forms a homogeneous phase with the compound of the carotenoid and vitamin-A series at between 30° and 150° C. and the homogeneous mixture is then separated with water.

3. A process as claimed in claim 1 wherein an aqueous solution of the surfactant is allowed to act on the compound of the carotenoid and vitamin-A series with intense agitation.

4. A process as claimed in claim 1 wherein the amount of the surfactant is 10 to 500% by weight of the compound of the carotenoid and vitamin-A series.

5. A process as claimed in claim 1 wherein the compound of the carotenoid and vitamin-A series is selected from the group consisting of axerophthene, all-trans-vitamin-A alcohol, vitamin-A acetate, vitamin-A acid methyl ester; retinene, 13-[2',6',6'-trimethylcyclohexene-(1')-yl-(1')] - 3,7,11 - trimethyltridecahexaene - (2,4,6,8, 10,12)-acid-(1)-ethyl ester and $\beta$-carotene.

6. A process as claimed in claim 1 wherein the surfactant is selected from the group consisting of polyoxyethylated castor oil, diisobutylnaphthalene sulfonic acid, polyoxyethylated sorbitan oleate, polyoxyethylated soap, polyoxyethylated sorbitan laurate, laurylmethylimidazolium methyl sulfate, oleic acid diethanolamide, polyoxyethylated oleic acid ethanolamide, trimethyl stearyl ammonium methyl sulfate, the disodium salt of ethylene diamine tetracetic acid, Turkey red oil, 2,4,6-trimethyl-4-stearyl morpholinium methyl sulfate, polyoxyethylated oleylamine, dinaphthylmethane-$\beta,\beta'$-disulfonic acid, polyoxyethylated coconut oil alcohols, sulfosuccinic acid diisooctyl ester, benzyl pyridinium chloride, dimethylanilinium dodecylbenzene sulfonate, the sodium salt of coconut alcohol sulfonic acid ester, triethanolamine monostearate, sodium alkylsulfonates ($C_{12}$–$C_{18}$), polyoxyethylated isooctylphenol and sodium lignin sulfonate.

7. A process as claimed in claim 1 carried out under an inert gas atmosphere.

8. A process as claimed in claim 1 wherein antioxidants are employed.

9. A process as claimed in claim 8 wherein tocopherol and ascorbic acid are used as antioxidants.

10. A process as in claim 1 wherein said compound is a deep orange red axerophthene and wherein said water-soluble surfactant is polyoxyethylated castor oil.

No references cited.

HENRY R. JILES, *Acting Primary Examiner.*